(12) United States Patent
Kakosimos et al.

(10) Patent No.: US 10,985,682 B2
(45) Date of Patent: Apr. 20, 2021

(54) METHOD OF CONTROLLING A MULTI-PHASE ELECTRICAL MACHINE

(71) Applicant: ABB Schweiz AG, Baden (CH)

(72) Inventors: Panagiotis Kakosimos, Västerås (SE); Rahul Kanchan, Västerås (SE); Georgios Stamatiou, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/749,057

(22) Filed: Jan. 22, 2020

(65) Prior Publication Data

US 2020/0295691 A1    Sep. 17, 2020

(30) Foreign Application Priority Data

Mar. 12, 2019    (EP) ..................... 19162064

(51) Int. Cl.
| | | |
|---|---|---|
| *H02P 21/00* | (2016.01) | |
| *H02P 21/22* | (2016.01) | |
| *H02P 27/12* | (2006.01) | |

(52) U.S. Cl.
CPC .............. *H02P 21/22* (2016.02); *H02P 27/12* (2013.01)

(58) Field of Classification Search
CPC ................................ H02P 21/22; H02P 27/12
USPC .................................................. 318/400.02
See application file for complete search history.

(56) References Cited

U.S. PATENT DOCUMENTS

| | | | |
|---|---|---|---|
| 4,761,703 A | 8/1988 | Kliman et al. | |
| 9,568,896 B2* | 2/2017 | Tenca | ..................... G05B 17/02 |
| 10,230,321 B1* | 3/2019 | Papini | ................. H02P 29/0241 |
| 2011/0141774 A1* | 6/2011 | Kane | ..................... H02M 1/126 |
| | | | 363/37 |
| 2017/0194784 A1* | 7/2017 | Alaas | ..................... H02H 3/165 |

OTHER PUBLICATIONS

Y. Maouche et al: "Analysis of stator current of dual-three phase induction motor drive under broken bar fault condition", 2018 13th IEEE Conference on Industrial Electronics and Applications (ICIEA), published Jun. 28, 2018, pp. 560-564.
Extended European Search Report Application No. 19162064 Completed: Jun. 11, 2019; dated Jul. 1, 2019 8 Pages.
Wang Xueqing et al: "Fault Diagnosis and Tolerance of Dual Three-phase PMSM Drives", 2018 IEEE Energy Conversion Congress and Exposition (ECCE), IEEE, published Sep. 23, 2018, pp. 325-330.

(Continued)

*Primary Examiner* — Erick D Glass
(74) *Attorney, Agent, or Firm* — Whitmyer IP Group LLC

(57) ABSTRACT

A method of controlling a multi-phase electrical machine by means of a power converter, wherein the method includes: a) controlling the electrical machine by utilizing vector space decomposition, VSD, wherein the controlling involves releasing control of the current of a harmonic while maintaining control of the current of the fundamental, b) measuring phase currents of the electrical machine while the control of the current of the harmonic is released, c) transforming the current measurements using VSD to obtain a current signature of the harmonic, and d) determining whether a fault is present in the electrical machine or the power converter based on a comparison of the current signature with a reference current signature of the harmonic.

12 Claims, 3 Drawing Sheets

(56) References Cited

OTHER PUBLICATIONS

Zhao Y et al: "Space vector PWM control of dual three phase induction machine using vector space decomposition", Industry Application Society Annual Meeting, 1994, Conference Record of the 1994 IEEE Denver, CO, USA Oct. 2-6, New York, NY, USA, IEEE, published Oct. 2, 1994, pp. 742-749.

* cited by examiner

METHOD OF CONTROLLING A MULTI-PHASE ELECTRICAL MACHINE

TECHNICAL FIELD

The present disclosure generally relates to multi-phase electrical machines and in particular to a method of controlling a multi-phase electrical machine.

BACKGROUND

One of the most widely used methods for detecting fault conditions in electrical machines is performing a Fourier transform on the sensed current signal over at least a portion of the period of the time to provide the current signal spectra. The peaks in the current signal spectrum are located and their values are compared with those during healthy operation. A method of this type is disclosed in U.S. Pat. No. 4,761,703A.

The online use of the Fourier transform requires a lot of arithmetic operations. This becomes even more complicated because the period of the analyzed signal is unknown. Thus, the application of windowed Fourier transform is needed.

The publication "Fault Diagnosis of Sensors for T-type Three-Level Inverter-fed Dual Three-Phase Permanent Magnet Synchronous Motor Drives", X. Wang et al, Power Electronics and Drives, AOP, 2018, relies on a different approach for fault detection. In particular, this publication relies on Vector Space Decomposition (VSD) for fault detection. A drawback with the disclosed method is that it requires that a very significant fault, e.g. a fault in the current sensor, has to occur in order to be able to detect it.

SUMMARY

In view of the above, an object of the present disclosure is to provide a method of controlling a multi-phase electrical machine which solves, or at least mitigates, the problems of the prior art.

There is hence according to a first aspect of the present disclosure provided a method of controlling a multi-phase electrical machine by means of a power converter, wherein the method comprises: a) controlling the electrical machine by utilizing vector space decomposition, VSD, wherein the controlling involves releasing control of the current of a harmonic while maintaining control of the current of the fundamental, b) measuring phase currents of the electrical machine while the control of the current of the harmonic is released, c) transforming the current measurements using VSD to obtain a current signature of the harmonic, and d) determining whether a fault is present in the electrical machine or the power converter based on a comparison of the current signature with a reference current signature of the harmonic.

The method of X. Wang et al does not control the harmonics differently when analyzing the harmonic content. Therefore, only very serious faults will become apparent by this method.

By releasing control of a harmonic, the harmonic is subjected to no control. This means that the harmonic will become present in the current in the electrical machine, and will hence be included in the current measurements obtained in step b). The VSD approach in multi-phase machines enables a decomposition of the harmonics in different orthogonal subspaces. Hence, with the knowledge of the harmonic being present in the measured currents due to the releasing of its control, the harmonic may be identified in its subspace and the presence of a fault condition may thereby be determined based on the current signature of the harmonic in its subspace. Since the fundamental is still under control, the control of the electrical machine is not affected. The method is hence non-invasive in the sense that it does not affect the load. When step d) has been performed, the harmonic is controlled to zero, whilst control of the fundamental is maintained. In this manner, any harmonic losses occurring during the release of control of the harmonic may be eliminated as soon as the monitoring of the electrical machine and/or the power converter has been performed.

The harmonic may be an odd harmonic.

The harmonic may be a low-order harmonic, such as the $3^{rd}$, the $5^{th}$, the $7^{th}$ or the $9^{th}$ harmonic etc. up to the number of phases m if m is an odd number or up to the number of phases m minus one, i.e. m−1, if m is an even number.

Typically, it is preferable to release control of a harmonic with an order as low as possible, e.g. the lowest harmonic present in the current. The harmonic content may depend on the configuration of the electrical machine. For example, if the electrical machine comprises two three-phase windings where the neutrals are not connected, the $3^{rd}$ harmonic will not be present. In this case, control of the $5^{th}$ harmonic may for example be released. In configurations where the $3^{rd}$ harmonic is present, the control of the $3^{rd}$ harmonic may be released.

Prior to step a), the electrical machine is controlled utilizing VSD, wherein the controlling prior to step a) preferably involves controlling the current of the harmonic to zero while maintaining control of the current of the fundamental.

One embodiment comprises controlling the electrical machine after step d) by utilizing VSD, wherein the controlling involves controlling the current of the harmonic to zero. Control of the current of the fundamental is maintained.

According to one embodiment in step d) it is determined that a fault is present in the electrical machine or in the power converter in case the current signature deviates from the reference current signature with more than a predetermined amount.

According to one example, the current signature may be compared with reference fault current signatures in case the current signature deviates from the reference current signature. Each reference fault current signature may be associated with a specific type of fault, such as power converter fault, e.g. a semiconductor fault of one of the switches in the power converter, or an electrical machine fault, such as an eccentricity fault, or a rotor or stator short circuit fault, e.g. turn-to-turn short circuit faults.

According to one embodiment step a) involves releasing control of a plurality of harmonics while maintaining control of the current of the fundamental, wherein step c) involves obtaining a current signature of each respective harmonic, and step d) involves comparing each current signature with a respective reference current signature.

According to one embodiment each of the current signature and the reference current signature is a magnitude or trajectory of the current in a rotating reference frame or a stator reference frame associated with the harmonic. The current signature may for example be the magnitude of the current in a rotating reference frame such as the dq-frame or the αβ-stator reference frame.

The current signature could alternatively be the trajectory of the current during e.g. one or more time periods of the fundamental.

According to one embodiment the reference current signature is a current signature of an earlier iteration of steps a)-d). The last iteration may for example be the last iteration before the current iteration. The reference current signature may thereby be dynamically updated as the machine ages. This may provide a more precise indication of whether a fault is present, since the characteristics of the electrical machine may change somewhat during its lifetime.

One embodiment comprises, in case it is determined in step d) that no fault is present, storing the current signature for use as a reference current signature in a later iteration of steps a)-d). The later iteration may for example be the next iteration of steps a)-d).

One embodiment comprises obtaining a speed of the electrical machine, obtaining a reference magnitude of a predetermined harmonic for the speed, and in case the reference magnitude of the predetermined harmonic is larger than a predetermined threshold value, reducing the speed of the electrical machine prior to step a).

The predetermined harmonic may for example be the harmonic that is released from control in step a).

The reference magnitude of the predetermined harmonic may for example be obtained from a look-up table which comprises magnitudes for the harmonic at different speeds, and optionally for different loads of the electrical machine.

The magnitude of the harmonic(s) present in the electrical machine in the event that it/they are released from control may be dependent of the speed and the load of the electrical machine. Hereto, according to this example, in case it is determined that the magnitude of a harmonic would be too high in case control of the harmonic would be released, the speed of the electrical machine is reduced before step a).

One embodiment comprises performing steps a)-d) as soon as a predetermined amount of time has lapsed since the previous iteration of steps a)-d). Steps a)-d) may for example be performed once an hour, once a day, once a week, or at any interval that is deemed appropriate for a particular application. When steps a)-d) are not being performed the electrical machine may be operated in a regular manner, e.g. by controlling the fundamental as desired and controlling the one or more harmonics to zero.

According to one embodiment the multi-phase electrical machine comprises at least five electrical phases, i.e. m>5.

There is according to a second aspect of the present disclosure provided a computer program comprising computer code which when executed by processing circuitry of a control system causes the control system to perform the steps of the method of the first aspect.

There is according to a third aspect of the present disclosure provided a control system for controlling a multi-phase electrical machine by means of a power converter, wherein the control system comprises: processing circuitry, and a storage medium comprising computer code which when executed by the processing circuitry causes the control system to perform the steps of the method of the first aspect.

There is according to a fourth aspect of the present disclosure provided an electrical machine system comprising: a multi-phase electrical machine, a power converter configured to be connected to the electrical machine for controlling the electrical machine, and a control system according to the third aspect configured to control the power converter.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the "element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The control system 1 comprises a storage medium 3 and processing circuitry 5. The storage medium comprises computer code which when executed by the processing circuitry 5 causes the control system 1 to perform the steps of the methods described herein.

The storage medium 3 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

The processing circuitry 5 may use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning control of one or more power converters and a multi-phase electrical machine.

Figure 1:
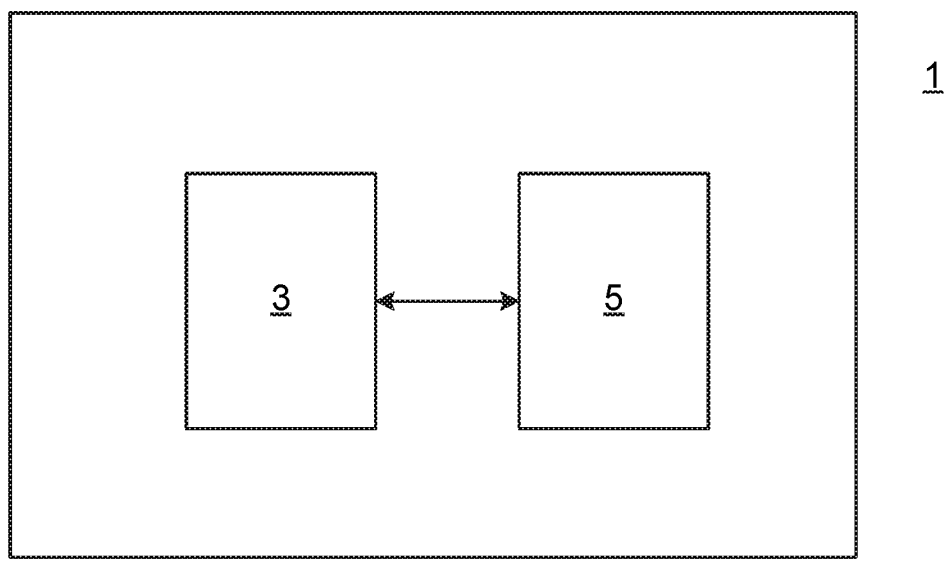
FIG. 1 schematically shows an example of a control system for controlling an electrical machine.
Figure 2:
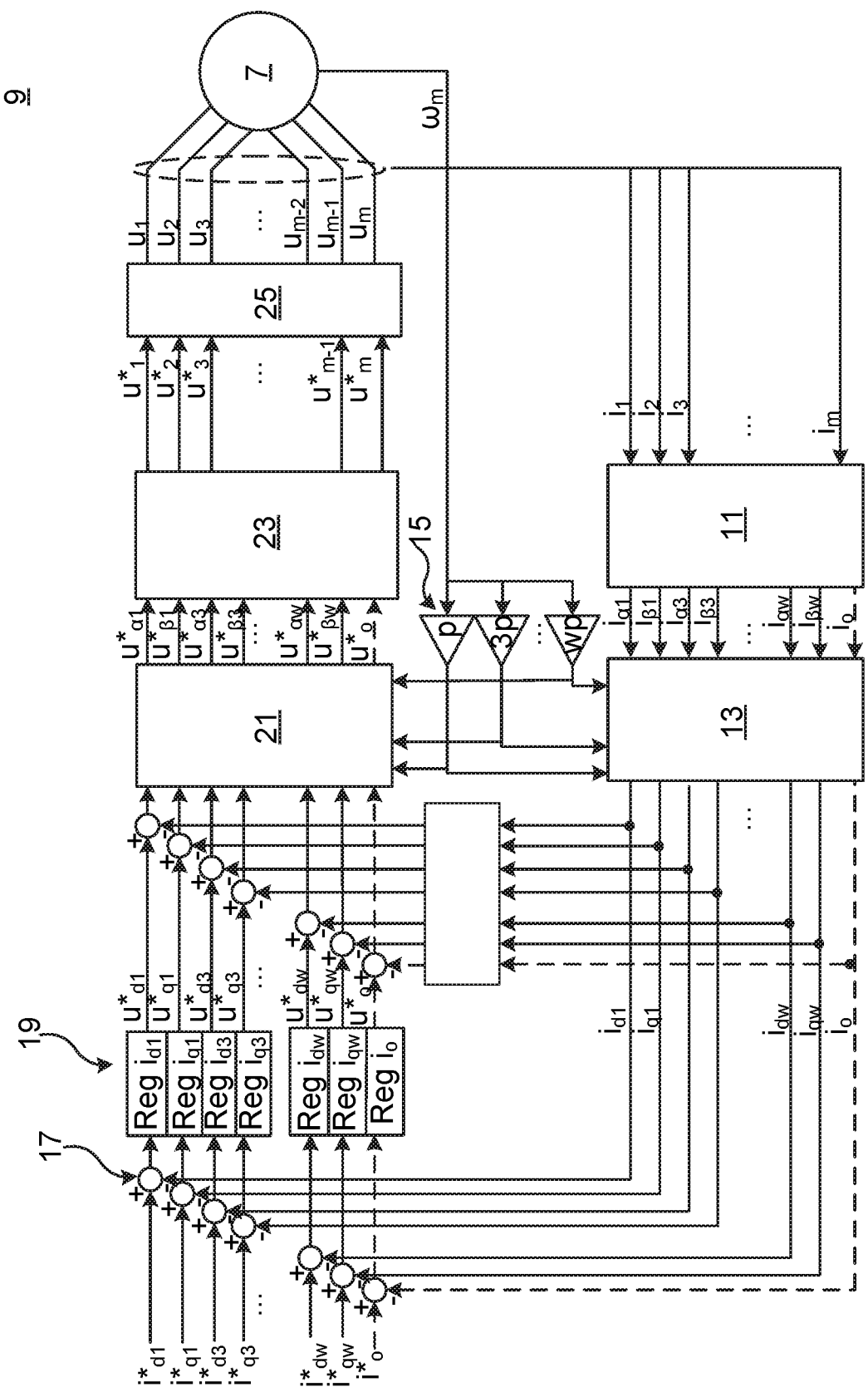
FIG. 2 schematically shows a block diagram of the control system in an electrical machine system.

FIG. 2 shows an example of a particular realization of the control system 1, in terms of functional blocks. The functional blocks may be implemented in software and/or hardware. The control system 1 is configured to control one or more power converters (not shown) configured to control an electrical machine 7. The control system 1, the power converter and the electrical machine 7 form an electrical machine system 9.

The control system 1 is configured to control the electrical machine 7 based on the VSD approach. According to the VSD approach for multi-phase electrical machines, the fundamental and each harmonic, e.g. each odd harmonic, may be controlled individually up to the number of phases m if m is odd, or the number of phases m minus one in case m is even. In particular, the VSD approach allows describing the dynamic behavior of odd harmonics in a multi-phase electrical machine. Odd harmonics include the fundamental frequency i.e. the $1^{st}$ harmonic, the $3^{rd}$ harmonic, the $5^{th}$ harmonic, etc. up to the number of phases m if m is an odd number or up to the number of phases minus one, i.e. m−1, if m is an even number.

A plurality of current sensors may be configured to measure the phase current $i_1, i_2, \ldots, i_m$ in each phase of the m phases of the electrical machine 7, m being at least 5. For example, the current sensors may be configured to measure the stator current in each phase of the electrical machine 7.

The control system 1 has a first transformation block 11 configured to obtain the current measurements from each of the current sensors. The first transformation block 11 is configured to transform the measured phase currents $i_1, i_2, \ldots, i_m$ to stator reference frame currents $i_{\alpha n}$ and $i_{\beta n}$ of respective stator reference frames up to a harmonic w. The first transformation block 11 is hence configured to generate (w+1)/2 stator reference frames, one for the fundamental and one for each odd harmonic of the fundamental. The fundamental and the harmonics are decomposed into orthogonal stator reference frame subspaces as a result of using VSD. The first transformation block 11 may be configured to perform a generalized Clarke transformation. In FIG. 2, the stator reference frame currents $i_{\alpha 1}$ and $i_{\beta 1}$ denote those of a first stator reference frame, which is associated with the fundamental. In general, the stator reference frame currents $i_{\alpha n}$ and $i_{\beta n}$ denoted those of the stator reference frame associated with the $n^{th}$ harmonic.

The control system 1 has a second control block 13 configured to receive the stator reference frame currents $i_{\alpha n}$ and $i_{\beta n}$ of all the stator reference frames from the fundamental up to the $w^{th}$ harmonic from the first control block 11, i.e. for n=1, ..., w with n being odd. The second control block 13 is configured to transform the stator reference frame currents $i_{\alpha n}$ and $i_{\beta n}$ to rotor reference frame currents. Thus (w+1)/2 rotor reference frames are generated. Each rotor reference frame may be the dq-frame, with corresponding rotor reference frame currents $i_{dn}$ and $i_{qn}$ for n=1, ..., w with n being odd. The second transformation block 13 may be configured to perform a generalized Park transformation.

The control system 1 may be configured to obtain the current electrical machine speed $\omega_m$. The control system 1 may furthermore comprise speed adaptors 15 configured to set the rotational speed of the rotor reference frames based on the speed $\omega_m$ of the electrical machine 7, the number of poles p of the electrical machine 7, and on the order of the harmonic. For example, for the rotor reference frame associated with the fundamental, the rotational speed with respect to the corresponding stator reference frame is the number of poles times the speed $\omega_m$, and the rotational speed of the rotor reference frame of the $n^{th}$ harmonic is n times the speed $\omega_m$ times the number of poles p.

Each rotor reference frame current $i_{dn}$ and $i_{qn}$ n=1, ... w with n being odd output by the second transformation block 13 is then combined, by means of respective combining blocks 17, with its corresponding rotor reference frame current to obtain the respective control error. Hereto, for example, the d-axis rotor reference frame current $i_{d1}$ of the fundamental is combined with the d-axis reference rotor reference frame current $i_{d1}$ and the q-axis rotor reference frame current $i_{q1}$ of the fundamental is combined with q-axis reference rotor reference frame current $i_{q1}$ to obtain the corresponding control errors.

In normal operation all of the reference rotor reference frame currents for the harmonics, for both the d-axis and the q-axis, i.e. $i^*_{dn}$ and $i^*_{qn}$ for n larger than 1 have a reference of zero. In electrical machine configurations which are 5-phase or which have connected neutrals, a homopolar current component it also exists, which is also controlled to zero. The fundamental is controlled based on the desired speed and torque. In general, the fundamental and all of the harmonics are controlled individually, as a result of utilization of the VSD approach for multi-phase electrical machines.

The exemplified control system 1 comprises a plurality of current regulators 19. Each current regulator 19 is configured to regulate a corresponding current $i_{dn}$ or $i_{qn}$ or $i_0$, when applicable, based on the respective control error, to thereby obtain voltage references $u^*_{dn}$ and $u^*_{qn}$ for n=1, ..., w with n being odd, and when applicable $u^*_0$. Thus, for example a first regulator 19 is configured to control a current $i_{d1}$ based on the control error between the d-axis rotor reference frame current $i_{d1}$ and the d-axis reference rotor reference frame current $i^*_{d1}$. Corresponding voltage references in the rotor reference frame are thereby obtained. For example, in the case of the regulation based on the control error of the d-axis rotor reference frame current $i_{d1}$ and the d-axis reference rotor reference frame current $i^*_{d1}$ of the fundamental, a voltage reference $u^*_{d1}$ is obtained.

The control system 1 furthermore comprises a third transformation block 21. The third transformation block 21 is configured to transform the voltage references $u^*_{dn}$ and $u^*_{qn}$ for n=1, ... w with n being odd, from the rotor reference frames to the stator reference frames for each harmonic. The third control block 21 may be configured to perform a generalized inverse Park transformation. Voltage references $u^*_{\alpha n}$ and $u^*_{\beta n}$ for n=1, ..., w with n being odd are thereby obtained in the respective orthogonal stator reference frames. The speed adaptors 15 are configured to provide the rotational speed of the rotor reference frames based on the speed $\omega_m$ of the electrical machine 7, the number of poles p of the electrical machine 7, and on the order of the harmonic, to the third transformation block 21 to perform the inverse transformations to the orthogonal stator reference frames.

The control system 1 comprises a fourth transformation block 23. The fourth transformation block 23 has inputs connected to the outputs of the third transformation block 21. The fourth transformation block 23 may be configured to perform a generalized inverse Clarke transformation.

The control of the electrical machine 7 may be provided by a single power converter or by a plurality of power converters. In the latter case, each power converter may be configured to control a respective group of three windings. The windings of the electrical machine 7 are in this case subdivided into m/3 sets of three-phase windings. The fourth transformation block 23 is configured to generate voltage references for each phase, or in groups of three phases in the abc-frame. The fourth transformation block 23 is configured to generate a voltage reference $u^*_1$ to $u^*_m$ for each phase based on the voltage references $u^*_{\alpha n}$ and $u^*_{\beta n}$ received from the third transformation block 21.

The exemplified control system 1 furthermore comprises a modulator block 25. The modulator block 25 has inputs connected to the outputs of the fourth transformation block 23. The modulator block 25 is configured to control all of the phases of the electrical machine 7. According to one example the modulator block 25 is configured to control all of the phases of the electrical machine 7 as a single group. Alternatively, the modulator block 25 may be configured to control for example groups of three phases. In this case, the modulator block 25 may be configured to control respective three phases of the electrical machine 7. The modulator block 25 is configured to control switches of the one or more power converters to generate voltages $u_1, u_2, \ldots, u_m$, based on the voltage references $u^*_1$ to $u^*_m$ obtained from the fourth transformation block 23. The modulator block 25 may for example utilize pulse with modulation (PWM) control of the switches to generate the voltages $u_1, u_2, \ldots, u_m$.

When a monitoring action of the electrical machine 7 and/or of the one or more power converters is to be initiated, the control of all of the harmonics, or at least all of the harmonics not involved in torque generation, may according to one example be released. As one alternative, for example, the control of only one of the harmonics may be released, e.g. the control of the lowest available harmonic. The control of the fundamental is maintained, because it is involved in the torque generation of the electrical machine 7.

A monitoring action may for example be performed at predetermined intervals, i.e. when a predetermined time has lapsed since the latest monitoring action. Between two monitoring actions, the fundamental as well as all of the harmonics are controlled normally, i.e. the harmonics are controlled to be zero.

The releasing of the control of the one or more harmonics may be obtained in a number of different ways. For example, all of the rotor reference frame currents $i_{dn}$ and $i_{qn}$ $n=2, \ldots$ w with n being odd, of the harmonics output by the second transformation block 13 may be set to zero before being combined with the reference rotor reference frame currents $i^*_{dn}$ and $i^*_{qn}$ which are zero, in the combining blocks 17. In this manner, the control error will be zero, and so will the voltage references output by the corresponding regulators 19, and those output by the third transformation block 21. Since the voltage references for the harmonics are zero, the harmonics will not be controlled. Alternatively, the fourth transformation block 23 may set the voltage references of the harmonics to zero, for example by means of a transformation matrix which is provided with zeros in appropriate elements. In normal operation another matrix may be used, which does not set the elements for the harmonics to zero.

The current sensors will in case that one or more harmonics have been released from control detect phase currents which include harmonics. The first transformation block 11 will in this case generate stator reference frames for the harmonics which have current signatures of non-zero magnitude. The processing circuitry 5 is configured to compare the current signatures of one or more of the harmonics with the corresponding reference current signature. For example, the current signature may be the magnitude of the harmonic. The magnitude of the harmonic in its stator reference frame may hence be compared with a reference magnitude for the harmonic in question. In case there is a deviation between the current signature and the reference current signature which is greater than a predetermined amount, e.g. a predetermined threshold value, it is determined that a fault condition is present. The current signature could as an alternative be the trajectory of the current of the harmonic in the corresponding stator reference frame obtained during e.g. one or more periods of the fundamental.

In case it is determined that a fault condition is present, according to one example, the current signature may be compared with a plurality of reference fault current signatures, each being associated with a certain type of fault. In this manner, if a match is found, the type of fault may be determined.

When the monitoring action has been performed, i.e. when the current signature of at least one harmonic has been compared with the corresponding reference current signature, the currents of the harmonics are once again controlled to zero. The fourth transformation block 23 hence obtains voltage references for all of the harmonics from the third transformation block 21, and they are actively used in the fourth transformation blocks 23 and the modulator block 25 for controlling the electrical machine 7. The control of the fundamental is maintained.

FIGS. 3a-3d show four examples with a certain fault condition. In the present example, the fault condition is an eccentricity fault of the rotor.

Figure 3A:
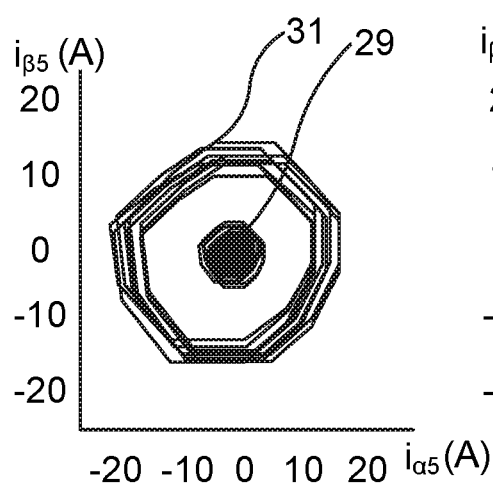
FIGS. 3a-3d schematically show graphs of currents of the $5^{th}$ harmonic in the stationary reference frame during a gradually increasing eccentricity fault with control of the $5^{th}$ harmonic maintained and with control of the $5^{th}$ harmonic released in an electrical machine comprising two three-phase windings.
Figure 3B:
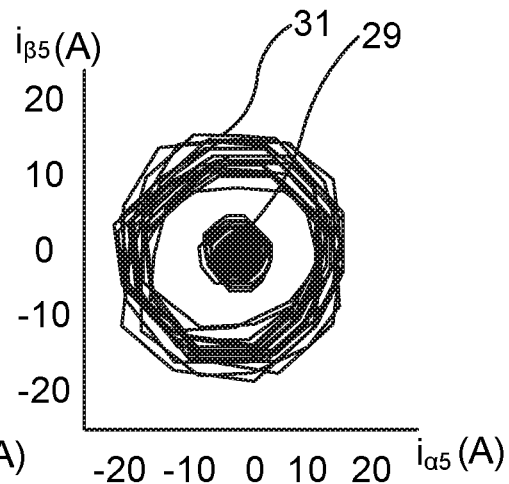
Figure 3C:
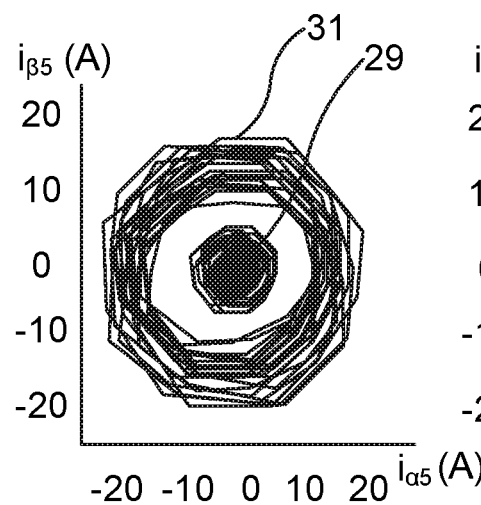
Figure 3D:
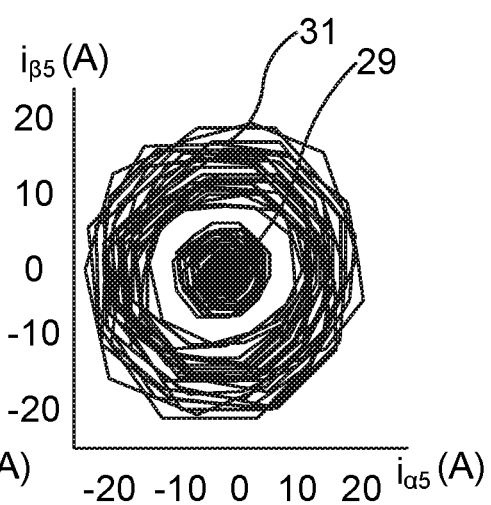

In FIG. 3a the stator reference frame current of the $5^{th}$ harmonic in the stator reference frame associated with the $5^{th}$ harmonic is shown. A first curve 29 shows the current signature of the $5^{th}$ harmonic in the form of a trajectory when the $5^{th}$ harmonic is controlled to be zero. A second curve 31 shows the current signature of the $5^{th}$ harmonic in the form of a trajectory when control of the $5^{th}$ harmonic is released. For each of the FIGS. 3b-3d, the eccentricity is gradually increased so that the eccentricity is higher in FIG. 3b than in FIG. 3a, and the eccentricity is higher in FIG. 3c than in FIG. 3b and so on. As can be seen, the first curve 29 is substantially the same, or only slightly different as the condition worsens. The $5^{th}$ harmonic will hence only change slightly as the condition worsens when the $5^{th}$ harmonic is controlled to zero. On the other hand, the second curve 31 shows major changes as the condition worsens. It may thereby be determined that a fault condition is present in the electrical machine 7 by comparing the current signature corresponding to the second curve 31 with a corresponding reference signature curve for the $5^{th}$ harmonic without control of the harmonic.

According to one example, when the latest current signature for a harmonic has been obtained by means of the first transformation block 11, the latest current signature may be stored in the storage medium 3 as the reference current signature for a subsequent monitoring action. The reference current signature will thereby be updated for example for every iteration of the method. Alternatively, the same respective reference current signature for each harmonic may be used throughout the lifetime of the electrical machine 7.

According to one example, the control system 1 may be configured to reduce the speed of the electrical machine 7 prior to releasing control of one or more of the harmonics, if considered necessary. The processing circuitry 5 is in this variation configured to obtain the current speed of the electrical machine 7, and optionally a current load, and to obtain a reference magnitude of a predetermined harmonic for the current speed from for example a look-up table which contains a reference magnitude for each harmonic for a plurality of different speeds of the electrical machine 7. The reference magnitudes may also be associated with different loads. In case the reference magnitude of the predetermined harmonic is larger than a predetermined threshold value associated with the current speed and optionally the current load, the control system 1 reduces the speed of the electrical machine prior to releasing the control of the one or more harmonics.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of controlling a multi-phase electrical machine by means of a power converter, the method comprising:
   a) controlling the electrical machine by utilizing vector space decomposition, VSD, wherein the controlling involves releasing control of a current of a harmonic while maintaining control of a current of a fundamental;
   b) measuring phase currents of the electrical machine while the control of the current of the harmonic is released;
   c) transforming the current measurements using the VSD to obtain a current signature of the harmonic; and
   d) determining whether a fault is present in the electrical machine or in the power converter based on a comparison of the current signature with a reference current signature of the harmonic.

2. The method of claim 1, wherein in step d) it is determined that a fault is present in the electrical machine or in the power converter in case the current signature deviates from the reference current signature with more than a predetermined amount.

3. The method of claim 1, wherein step a) involves releasing control of a plurality of harmonics while maintaining control of the current of the fundamental, wherein step c) involves obtaining a current signature of each respective harmonic, and step d) involves comparing each current signature with a respective reference current signature.

4. The method of claim 1, wherein each of the current signature and the reference current signature is a magnitude or trajectory of the current in a rotating reference frame or a stator reference frame associated with the harmonic.

5. The method of claim 1, wherein the reference current signature is a current signature of an earlier iteration of steps a)-d).

6. The method of claim 5, comprising, in case it is determined in step d) that no fault is present, storing the current signature for use as a reference current signature in a later iteration of steps a)-d).

7. The method of claim 1, comprising obtaining a speed of the electrical machine, obtaining a reference magnitude of a predetermined harmonic for the speed, and in case the reference magnitude of the predetermined harmonic is larger than a predetermined threshold value, reducing the speed of the electrical machine prior to step a).

8. The method of claim 1, comprising performing steps a)-d) as soon as a predetermined amount of time has lapsed since the previous iteration of steps a)-d).

9. The method of claim 1, wherein the multi-phase electrical machine includes at least five electrical phases.

10. A computer program product embodied in a non-transitory computer readable medium including computer code which, when executed by processing circuitry of a control system, causes the control system to perform the steps of:
   a) controlling the electrical machine by utilizing vector space decomposition, VSD, wherein the controlling involves releasing control of a current of a harmonic while maintaining control of a current of a fundamental;
   b) measuring phase currents of the electrical machine while the control of the current of the harmonic is released;
   c) transforming the current measurements using the VSD to obtain a current signature of the harmonic; and
   d) determining whether a fault is present in the electrical machine or in the power converter based on a comparison of the current signature with a reference current signature of the harmonic.

11. A control system for controlling a multi-phase electrical machine by means of a power converter, the control system comprising:
   processing circuitry; and
   a storage medium including computer code which, when executed by the processing circuitry, causes the control system to perform the steps of;
   a) controlling the electrical machine by utilizing vector space decomposition, VSD, wherein the controlling involves releasing control of a current of a harmonic while maintaining control of a current of a fundamental;
   b) measuring phase currents of the electrical machine while the control of the current of the harmonic is released;
   c) transforming the current measurements using the VSD to obtain a current signature of the harmonic; and
   d) determining whether a fault is present in the electrical machine or in the power converter based on a comparison of the current signature with a reference current signature of the harmonic.

12. An electrical machine system, comprising:
   a multi-phase electrical machine;
   a power converter configured to be connected to the electrical machine for controlling the electrical machine; and
   a control system having;
   processing circuitry; and
   a storage medium including computer code which, when executed by the processing circuitry, causes the control system to perform the steps of:
   a) controlling the electrical machine by utilizing vector space decomposition, VSD wherein the controlling involves releasing control of a current of a harmonic while maintaining control of a current of a fundamental;
   b) measuring phase currents of the electrical machine while the control of the current of the harmonic is released;
   c) transforming the current measurements using the VSD to obtain a current signature of the harmonic; and
   d) determining whether a fault is present in the electrical machine or in the power converter based on a comparison of the current signature with a reference current signature of the harmonic;
   wherein each of the current signature and the reference current signature is a magnitude or trajectory of the current in a rotating reference frame or a stator reference frame associated with the harmonic.

* * * * *